Sept. 10, 1940.   F. B. HALFORD   2,214,529
FOUR-STROKE CYCLE INTERNAL COMBUSTION ENGINE
Filed May 9, 1939
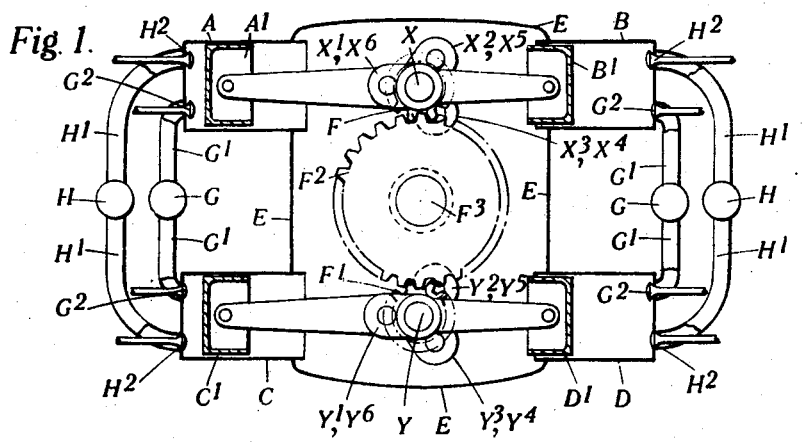
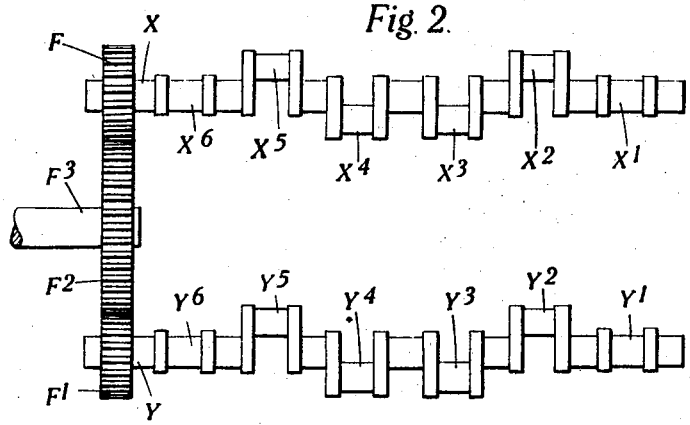
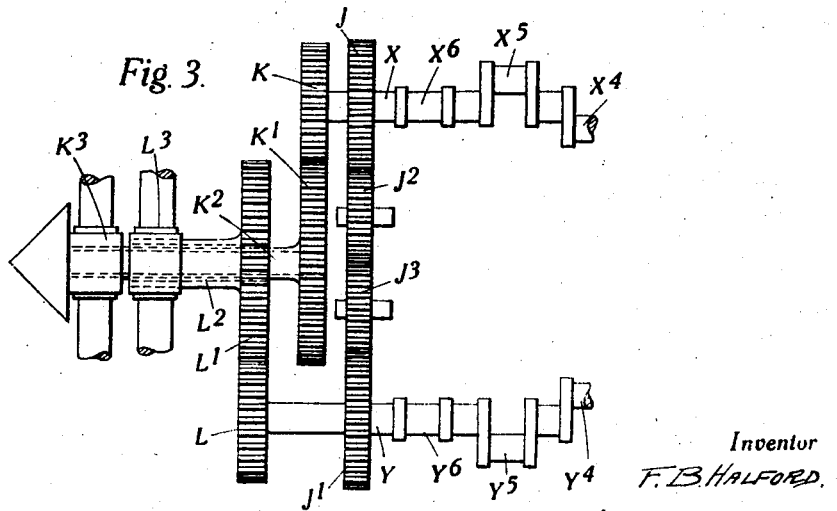
Inventor
F. B. HALFORD
by
Attorneys Patented Sept. 10, 1940

2,214,529

UNITED STATES PATENT OFFICE 2,214,529

FOUR-STROKE CYCLE INTERNAL COMBUSTION ENGINE

Frank Bernard Halford, Edgware, England, assignor to D. Napier & Son Limited, London, England, a company of Great Britain Application May 9, 1939, Serial No. 272,693
In Great Britain May 11, 1938

13 Claims. (Cl. 123—56)

This invention relates to internal combustion engines operating on the four-stroke cycle of the type comprising two parallel crankshafts geared together so that they rotate at the same speed and two rows or banks of cylinders disposed on diametrically opposite sides of each crankshaft with their axes at right angles to the plane in which lie the axes of rotation of the two crankshafts. For the sake of convenience such engines will be hereinafter referred to as "H-section engines", the banks of cylinders which lie parallel to one another on the same side of the plane containing the crankshaft axes will be referred to as "adjacent banks" and cylinders which lie in different banks but in the same transverse plane at right angles to the axes of the crankshafts will be referred to as "corresponding cylinders."

The object of the invention is to provide an improved engine of the above type in which the liability for synchronous torsional oscillations, at least of the more violent character, to occur in the crankshafts and transmission gearing within the normal speed range of the engine will be reduced or eliminated.

To this end, in an H-section internal combustion engine according to the invention operating on the four-stroke cycle and having six cylinders in each bank, the crankshafts are so constructed and geared together that the piston in each cylinder in any bank reaches its top dead centre at the same moment as the piston in the corresponding cylinder in the adjacent bank, the firing interval between corresponding cylinders in adjacent banks is 360° of crankshaft rotation and each cylinder in a bank fires simultaneously with a cylinder in the adjacent bank.

It will be seen that each piston in a bank reaches its top dead centre simultaneously with another piston in the same bank and with the two corresponding pistons in the adjacent bank.

It is to be understood that the cylinders may be arranged horizontally, vertically or otherwise and that the term "top dead centre" refers to the point where a piston reaches the point nearest the cylinder head irrespective of the direction in which the cylinder axis extends.

The firing order to the cylinders in each bank is preferably that normal for a six-cylinder in-line engine. Thus, each crankshaft is preferably so constructed that the pistons in cylinders 1 and 6 in each bank move synchronously, the pistons in cylinders 2 and 5 in each bank move synchronously and the pistons in cylinders 3 and 4 in each bank move synchronously. In such an engine the firing order of the cylinders in each bank may be, for example 1—5—3—6—2—4 or 1—4—2—6—3—5, cylinder 1 in each bank firing simultaneously with cylinder 6 in the adjacent bank, cylinder 2 in each bank firing simultaneously with cylinder 5 in the adjacent bank and cylinder 3 in each bank firing simultaneously with cylinder 4 in the adjacent bank.

Moreover, with such an engine the induction system may consist of two central feeder pipes each extending between two adjacent banks of cylinders with a short connecting pipe from the central feeder to each individual cylinder. It will be seen that with this arrangement, since the firing interval between corresponding cylinders of adjacent banks is 360° of crankshaft rotation, such an arrangement results in even spacing of the induction impulses in the short connecting pipes without any overlapping of the periods during which mixture is being drawn respectively to two adjacent cylinders from any one point in the length of the central feeder.

An exhaust system comprising two main exhaust pipes each extending between two adjacent banks of cylinders with short connecting pipes from the main pipe to each individual cylinder may also be employed whether an induction system of the above type is used or not, and will then have the advantage that no two cylinders exhaust into the main pipe simultaneously at the same point in its length.

The invention may be carried into practice in various ways but one construction according to the invention and a modification thereof are illustrated diagrammatically by way of example in the accompanying drawings, in which Figure 1 is a diagrammatic end elevation of one construction of engine according to the invention, Figure 2 is a side elevation showing the crankshafts and the gearing connecting them in the engine shown in Figure 1, and Figure 3 shows a modified arrangement of gearing connecting the crankshafts to one another and to two separate propeller shafts which may be adopted in an engine otherwise similar to that shown in Figures 1 and 2.

In the construction illustrated in Figures 1 and 2 the engine comprises four rows of cylinders designated respectively by the reference letters A, B, C and D all attached to a single crank case, indicated at E. Supported in bearings (not shown) in the crank case are two parallel crankshafts X and Y which are geared together at one end by gear wheels F, F¹ meshing with a common gear wheel F² mounted upon a common driven shaft F³ constituting, for example, a propeller shaft. It will thus be seen that the two crankshafts rotate in the same direction and at the same speed.

Each crankshaft is of a conventional type employed for six-cylinder in-line four-stroke cycle engines. That is to say the crankshaft X comprises six crank throws $X^1$, $X^2$, $X^3$, $X^4$, $X^5$, $X^6$ which are connected by connecting rods respectively to pistons $A^1$ and $B^1$ in the cylinders 1—6 of rows A and B, the crank throws $X^1$ and $X^6$ being angularly coincident, the crank throws $X^2$ and $X^5$ being angularly coincident and the crank throws $X^3$ and $X^4$ being angularly coincident, each pair of angularly coincident crank throws being displaced by 120° from the two other pairs of angularly coincident crank throws. The crankshaft Y is similarly constructed and arranged so that the crank throws $Y^1$ and $Y^6$ are angularly coincident, the crank throws $Y^2$ and $Y^5$ are angularly coincident and the crank throws $Y^3$ and $Y^4$ are angularly coincident the cranks $Y^1$—$Y^6$ being connected by connecting rods to pistons $C^1$ and $D^1$ in the cylinders 1—6 of rows C and D. For the sake of clearness, the positions of all six cranks on each crankshaft are indicated by the appropriate reference letters in Figure 1 although only three of such cranks are actually visible.

The cylinders in each bank will be referred to respectively by the numbers 1 to 6 starting at the front cylinder and ending at the rear cylinder. It will thus be seen that for each bank of cylinders the pistons in cylinders 1 and 6 reach their top dead centre simultaneously, the pistons in cylinders 2 and 5 reach their top dead centre simultaneously and the pistons in cylinders 3 and 4 reach their top dead centre simultaneously.

Further, as will be seen, the crankshafts are so geared together that each piston in a cylinder in the bank A reaches its top dead centre simultaneously with the piston in the corresponding cylinder in the adjacent bank C while similarly each piston in a cylinder in the bank B reaches its top dead centre simultaneously with the piston in the corresponding cylinder in the bank D.

The arrangement is such that the firing interval between the corresponding cylinders in banks A and C is 360° of crankshaft rotation, that is to say half a complete working cycle, while similarly the firing interval between the corresponding cylinders in banks B and D is 360° of crankshaft rotation. Thus, each cylinder in bank A fires alternately with the corresponding cylinder in bank C but simultaneously with another cylinder in bank C while similarly each cylinder in the bank B fires alternately with the corresponding cylinder in the bank D but simultaneously with another cylinder in the bank D.

Thus, cylinder 1 in bank A will fire simultaneously with cylinder 6 of bank C, cylinder 2 of bank A will fire simultaneously with cylinder 5 of bank C, cylinder 3 of bank A will fire simultaneously with cylinder 4 of bank C, cylinder 4 of bank A will fire simultaneously with cylinder 3 of bank C, cylinder 5 of bank A will fire simultaneously with cylinder 2 of bank C and cylinder 6 of bank A will fire simultaneously with cylinder 1 of bank C. The cylinders in banks B and D will fire in a similar manner relatively to one another.

The firing order of the cylinders in each bank may be any one of the possible firing orders for a six-cylinder in-line four-stroke internal combustion engine, the same firing order being, however, employed for each of the separate banks of cylinders. The arrangement is preferably such, however, that the individual cylinders of each bank fire at equal intervals of 120° of crankshaft rotation, the firing order for each bank of cylinders being conventional firing order for a six-cylinder in-line four-stroke cycle engine, namely the firing order 1—5—3—6—2—4 or 1—4—2—6—3—5.

Thus the firing order and firing intervals of the various cylinders may be any one of those shown in the following table, the two crankshafts being designated X and Y, the two rows of cylinders associated with crankshaft X being designated A and B while the two rows of cylinders associated with crankshaft Y are designated row C and row D as in the construction diagrammatically shown in Figures 1 and 2. The angles given are, it will be understood, angles of crankshaft rotation measured from the top dead centre position of the piston at the beginning of the firing stroke of cylinder 1 in row A.

| Bank | 0° | 60° | 120° | 180° | 240° | 300° | 360° | 420° | 480° | 540° | 600° | 660° | 720° |
|---|---|---|---|---|---|---|---|---|---|---|---|---|---|
| A | 1 |  | 5 |  | 3 |  | 6 |  | 2 |  | 4 |  | 1 |
| B |  | 4 |  | 1 |  | 5 |  | 3 |  | 6 |  | 2 |  |
| C | 6 |  | 2 |  | 4 |  | 1 |  | 5 |  | 3 |  | 6 |
| D |  | 3 |  | 6 |  | 2 |  | 4 |  | 1 |  | 5 |  |
| A | 1 |  | 5 |  | 3 |  | 6 |  | 2 |  | 4 |  | 1 |
| B |  | 3 |  | 6 |  | 2 |  | 4 |  | 1 |  | 5 |  |
| C | 6 |  | 2 |  | 4 |  | 1 |  | 5 |  | 3 |  | 6 |
| D |  | 4 |  | 1 |  | 5 |  | 3 |  | 6 |  | 2 |  |
| A | 1 |  | 2 |  | 4 |  | 6 |  | 5 |  | 3 |  | 1 |
| B |  | 4 |  | 6 |  | 5 |  | 3 |  | 1 |  | 2 |  |
| C | 6 |  | 5 |  | 3 |  | 1 |  | 2 |  | 4 |  | 6 |
| D |  | 3 |  | 1 |  | 2 |  | 4 |  | 6 |  | 5 |  |
| A | 1 |  | 2 |  | 4 |  | 6 |  | 5 |  | 3 |  | 1 |
| B |  | 3 |  | 1 |  | 2 |  | 4 |  | 6 |  | 5 |  |
| C | 6 |  | 5 |  | 3 |  | 1 |  | 2 |  | 4 |  | 6 |
| D |  | 4 |  | 6 |  | 5 |  | 3 |  | 1 |  | 2 |  |
| A | 1 |  | 2 |  | 3 |  | 6 |  | 5 |  | 4 |  | 1 |
| B |  | 3 |  | 6 |  | 5 |  | 4 |  | 1 |  | 2 |  |
| C | 6 |  | 5 |  | 4 |  | 1 |  | 2 |  | 3 |  | 6 |
| D |  | 4 |  | 1 |  | 2 |  | 3 |  | 6 |  | 5 |  |
| A | 1 |  | 2 |  | 3 |  | 6 |  | 5 |  | 4 |  | 1 |
| B |  | 4 |  | 1 |  | 2 |  | 3 |  | 6 |  | 5 |  |
| C | 6 |  | 5 |  | 4 |  | 1 |  | 2 |  | 3 |  | 6 |
| D |  | 3 |  | 6 |  | 5 |  | 4 |  | 1 |  | 2 |  |
| A | 1 |  | 5 |  | 4 |  | 6 |  | 2 |  | 3 |  | 1 |
| B |  | 4 |  | 6 |  | 2 |  | 3 |  | 1 |  | 5 |  |
| C | 6 |  | 2 |  | 3 |  | 1 |  | 5 |  | 4 |  | 6 |
| D |  | 3 |  | 1 |  | 5 |  | 4 |  | 6 |  | 2 |  |
| A | 1 |  | 5 |  | 4 |  | 6 |  | 2 |  | 3 |  | 1 |
| B |  | 3 |  | 1 |  | 5 |  | 4 |  | 6 |  | 2 |  |
| C | 6 |  | 2 |  | 3 |  | 1 |  | 5 |  | 4 |  | 6 |
| D |  | 4 |  | 6 |  | 2 |  | 3 |  | 1 |  | 5 |  |

It will be understood that the firing order and intervals may also be the reverse of any of those shown above. Thus the reverse of the first example given in the above table would be as follows:

| Bank | 0° | 60° | 120° | 180° | 240° | 300° | 360° | 420° | 480° | 540° | 600° | 660° | 720° |
|---|---|---|---|---|---|---|---|---|---|---|---|---|---|
| A | 1 |   | 4 |   | 2 |   | 6 |   | 3 |   | 5 |   | 1 |
| B |   | 2 |   | 6 |   | 3 |   | 5 |   | 1 |   | 4 |   |
| C | 6 |   | 3 |   | 5 |   | 1 |   | 4 |   | 2 |   | 6 |
| D |   | 5 |   | 1 |   | 4 |   | 2 |   | 6 |   | 3 |   |

Each adjacent pair of banks of cylinders has associated therewith an induction system comprising a main induction pipe G connected by short individual connecting pipes G¹ to the valve-controlled inlet ports G² of the cylinders in the two adjacent banks. Similarly each pair of adjacent banks of cylinders has associated therewith an exhaust system comprising a main exhaust pipe H connected by short individual connecting pipes H¹ to the valve-controlled exhaust ports H² in the cylinders of the two adjacent banks.

It is to be understood that although poppet valves have been diagrammatically shown, the arrangement is equally applicable to engines employing sleeve or other types of valve.

It will be seen that with such simple induction and exhaust systems in an engine according to the invention gas is not drawn into two cylinders simultaneously from the same point in the length of either main induction pipe nor does exhaust gas enter the same point in the length of either main exhaust pipe simultaneously from any two cylinders. Thus, satisfactory distribution and exhaust characteristics tend to be obtained.

In the modified arrangement shown diagrammatically in Figure 3, which may be employed in an engine otherwise similar to that diagrammatically illustrated in Figure 1, the two crankshafts X and Y are connected by gearing comprising gear wheels J and J¹ connected respectively to the two crankshafts X and Y and meshing respectively with intermeshing gear wheels J² and J³. The crankshaft X is connected by a further gear wheel K to a gear wheel K¹ secured to one propeller shaft K² carrying a propeller, indicated at K³, while the crankshaft Y carries a gear wheel L meshing with a gear wheel L¹ on a second hollow propeller shaft L² carrying a propeller, indicated at L³, the propeller shaft L² being coaxial with and surrounding the propeller shaft K². As will be seen the propeller shafts L² and K² rotate in opposite directions at the same speed as one another as do the crankshafts. The pistons in the various cylinders, however, reach their top dead centres in the same sequence and at the same angles of crankshaft rotation as in the construction shown in Figures 1 and 2. Thus the firing order of each bank of cylinders and the cylinders which fire simultaneously may in this construction also follow any one of those shown on the table given above.

It will be seen that with engines according to the invention there are altogether six main torque impulses for each revolution of the crankshafts and that with the phasing of the two crankshafts and the firing intervals chosen any two cylinders which fire simultaneously do not occupy the same transverse plane in the engine.

It will also be seen that the present invention departs from the generally recognized practice in multi-cylinder engines of so arranging the cylinders and cranks as to obtain the maximum number of torque impulses per revolution of the crankshaft or crankshafts and thereby obtain as small variations in the torque delivered by the engine as is possible. On the contrary, with an engine according to the present invention the number of torque impulses per revolution is at the most half that which could be obtained with the number of cylinders employed since pairs of cylinders fire simultaneously.

The invention is, however, based on a complete analysis of the forces tending to produce synchronous torsional oscillations in the crankshafts and transmission apparatus and with an engine according to the present invention the occurrence of such synchronous torsional oscillations, at least of the more violent character, tend to be eliminated, with the result that an engine is obtained having very good characteristics from this point of view. Furthermore, by constructing each crankshaft in the manner normal for a six-cylinder in-line engine, smoothness of operation of each individual portion of the engine represented by a crankshaft and a bank of cylinders tends to be obtained.

Again, with an engine according to the invention in which, as generally preferred and shown in Figures 1 and 2, the two crankshafts rotate in the same direction, the fact that adjacent crank pins on the two crankshafts rotate in synchronism enables the distance between the axes of the crankshafts to be small with consequent improvement in the compactness of the engine. Again, the invention enables a simple induction system or a simple exhaust system such as those referred to above or both such simple systems to be employed without overlapping of the periods of induction from any one point in the length of the central feeder associated with adjacent banks of cylinders or interference or overlapping of the periods of exhaust into any one point in the length of an exhaust pipe with the result that improved distribution and/or exhaust conditions tend to be obtained. Again, when the two crankshafts are connected to a common transmission shaft by separate gear wheels or trains of gear wheels meshing with different points in the circumference of a common gear wheel on the transmission shaft, the effect of the simultaneous firing in two banks of cylinders is to produce simultaneous substantially equal torque impulses on each crankshaft and thus tend to balance the power transmitted to the transmission shaft gear wheel respectively through the separate gear wheels or trains of gear wheels, whereby the transmission shaft gear wheel is maintained approximately in a state of pure torsion and is not subjected to any appreciable lateral thrusts or bending stresses due to differences in the tooth loads on the gear wheels meshing respectively with the opposite sides thereof.

It is to be understood that the construction more particularly described above is given by way of example only and that modifications may be made therein without departing from this invention.

What I claim as my invention and desire to secure by Letters Patent is:

1. A four-stroke cycle internal combustion engine including in combination two similar parallel crankshafts each having cranks I and G angularly coincident, cranks 2 and 5 angularly coincident and cranks 3 and 4 angularly coincident, two banks of cylinders each containing six cylinders disposed on diametrically opposite sides of each crankshaft with their axes at right angles to the plane in which lie the axes of rotation of the two crankshafts, pistons in the cylinders, each crank of each crankshaft being connected to the two pistons in corresponding cylinders of the two banks disposed on opposite sides of that crankshaft gearing connecting the crankshafts so that they rotate at the same speed and each piston in a bank reaches its top dead centre at the same moment as the corresponding piston in the adjacent bank, the firing interval between corresponding cylinders in adjacent banks being 360° of crankshaft rotation and each cylinder in a bank firing simultaneously with a cylinder in the adjacent bank.

2. A four-stroke cycle internal combustion engine including in combination two similar parallel crankshafts each having cranks 1 and 6 angularly coincident, cranks 2 and 5 angularly coincident and cranks 3 and 4 angularly coincident, two banks of cylinders each containing six cylinders disposed on diametrically opposite sides of each crankshaft with their axes at right angles to the plane in which lie the axes of rotation of the two crankshafts, gearing connecting the crankshafts so that they rotate at the same speed and each piston in a bank reaches its top dead centre at the same moment as the corresponding piston in the adjacent bank, the firing interval between corresponding cylinders in adjacent banks being 360° of crankshaft rotation and each cylinder in a bank firing simultaneously with a cylinder in the adjacent bank, the firing order of the cylinders in each bank being 1—5—3—6—2—4, cylinder 1 in each bank firing simultaneously with cylinder 6 in the adjacent bank, cylinder 2 in each bank firing simultaneously with cylinder 5 in the adjacent bank and cylinder 3 in each bank firing simultaneously with cylinder 4 in the adjacent bank.

3. A four-stroke cycle internal combustion engine including in combination two similar parallel crankshafts each having cranks 1 and 6 angularly coincident, cranks 2 and 5 angularly coincident and cranks 3 and 4 angularly coincident, two banks of cylinders each containing six cylinders disposed on diametrically opposite sides of each crankshaft with their axes at right angles to the plane in which lie the axes of rotation of the two crankshafts, gearing connecting the crankshafts so that they rotate at the same speed and each piston in a bank reaches its top dead centre at the same moment as the corresponding piston in the adjacent bank, the firing interval between corresponding cylinders in adjacent banks being 360° of crankshaft rotation and each cylinder in a bank firing simultaneously with a cylinder in the adjacent bank, the firing order of the cylinders in each bank being 1—4—2—6—3—5, cylinder 1 in each bank firing simultaneously with cylinder 6 in the adjacent bank, cylinder 2 in each bank firing simultaneously with cylinder 5 in the adjacent bank and cylinder 3 in each bank firing simultaneously with cylinder 4 in the adjacent bank.

4. A four-stroke cycle internal combustion engine including in combination two similar parallel crankshafts each having cranks 1 and 6 angularly coincident, cranks 2 and 5 angularly coincident and cranks 3 and 4 angularly coincident, two banks of cylinders each containing six cylinders disposed on diametrically opposite sides of each crankshaft with their axes at right angles to the plane in which lie the axes of rotation of the two crankshafts, pistons in the cylinders, each crank of each crankshaft being connected to the two pistons in corresponding cylinders of the two banks disposed on opposite sides of that crankshaft gearing connecting the crankshafts so that they rotate at the same speed and in the same direction and each piston in a bank reaches its top dead centre at the same moment as the corresponding piston in the adjacent bank, the firing interval between corresponding cylinders in adjacent banks being 360° of crankshaft rotation and each cylinder in a bank firing simultaneously with a cylinder in the adjacent bank.

5. A four-stroke cycle internal combustion engine including in combination two similar parallel crankshafts each having cranks 1 and 6 angularly coincident, cranks 2 and 5 angularly coincident and cranks 3 and 4 angularly coincident, two banks of cylinders each containing six cylinders disposed on diametrically opposite sides of each crankshaft with their axes at right angles to the plane in which lie the axes of rotation of the two crankshafts, gearing connecting the crankshafts so that they rotate at the same speed and in the same direction and each piston in a bank reaches its top dead centre at the same moment as the corresponding piston in the adjacent bank, the firing interval between corresponding cylinders in adjacent banks being 360° of crankshaft rotation and each cylinder in a bank firing simultaneously with a cylinder in the adjacent bank, the firing order of the cylinders in each bank being 1—5—3—6—2—4, cylinder 1 in each bank firing simultaneously with cylinder 6 in the adjacent bank, cylinder 2 in each bank firing simultaneously with cylinder 5 in the adjacent bank and cylinder 3 in each bank firing simultaneously with cylinder 4 in the adjacent bank.

6. A four-stroke cycle internal combustion engine including in combination two similar parallel crankshafts each having cranks 1 and 6 angularly coincident, cranks 2 and 5 angularly coincident and cranks 3 and 4 angularly coincident, two banks of cylinders each containing six cylinders disposed on diametrically opposite sides of each crankshaft with their axes at right angles to the plane in which lie the axes of rotation of the two crankshafts, gearing connecting the crankshafts so that they rotate at the same speed and in the same direction and each piston in a bank reaches its top dead centre at the same moment as the corresponding piston in the adjacent bank, the firing interval between corresponding cylinders in adjacent banks being 360° of crankshaft rotation and each cylinder in a bank firing simultaneously with a cylinder in the adjacent bank, the firing order of the cylinders in each bank being 1—4—2—6—3—5, cylinder 1 in each bank firing simultaneously with cylinder 6 in the adjacent bank, cylinder 2 in each bank firing simultaneously with cylinder 5 in the adjacent bank and cylinder 3 in each bank firing simultaneously with cylinder 4 in the adjacent bank.

7. A four-stroke cycle internal combustion engine including in combination two similar parallel crankshafts each crank of each of which is angularly coincident with another crank of the same crankshaft, two banks of cylinders each containing six cylinders disposed on diametrically opposite sides of each crankshaft with their axes at right angles to the plane in which lie the axes of rotation of the two crankshafts, pistons in the cylinders, each crank of each crankshaft being connected to the two pistons in corresponding cylinders of the two banks disposed on opposite sides of that crankshaft gearing connecting the crankshafts so that they rotate at the same speed and each piston in a bank reaches its top dead centre at the same moment as the corresponding piston in the adjacent bank, the firing interval between corresponding cylinders in adjacent banks being 360° of crankshaft rotation and each cylinder in a bank firing simultaneously with a cylinder in the adjacent bank, and two propeller shafts driven respectively from the two crankshafts.

8. A four-stroke cycle internal combustion engine including in combination two similar parallel crankshafts each crank of each of which is angularly coincident with another crank of the same crankshaft, two banks of cylinders each containing six cylinders disposed on diametrically opposite sides of each crankshaft with their axes at right angles to the plane in which lie the axes of rotation of the two crankshafts, gearing connecting the crankshafts so that they rotate at the same speed and each piston in a bank reaches its top dead centre at the same moment as the corresponding piston in the adjacent bank, the firing interval between corresponding cylinders in adjacent banks being 360° of crankshaft rotation and each cylinder in a bank firing simultaneously with a cylinder in the adjacent bank, two main induction pipes each extending between two adjacent banks of cylinders, and a short connecting pipe extending from each individual cylinder to the adjacent main induction pipe.

9. A four-stroke cycle internal combustion engine including in combination two similar parallel crankshafts each having cranks 1 and 6 angularly coincident, cranks 2 and 5 angularly coincident and cranks 3 and 4 angularly coincident, two banks of cylinders each containing six cylinders disposed on diametrically opposite sides of each crankshaft with their axes at right angles to the plane in which lie the axes of rotation of the two crankshafts, gearing connecting the crankshafts so that they rotate at the same speed and each piston in a bank reaches its top dead centre at the same moment as the corresponding piston in the adjacent bank, the firing interval between corresponding cylinders in adjacent banks being 360° of crankshaft rotation and each cylinder in a bank firing simultaneously with a cylinder in the adjacent bank, two main induction pipes each extending between two adjacent banks of cylinders, and a short connecting pipe extending from each individual cylinder to the adjacent main induction pipe.

10. A four-stroke cycle internal combustion engine including in combination two similar parallel crankshafts each crank of each of which is angularly coincident with another crank of the same crankshaft, two banks of cylinders each containing six cylinders disposed on diametrically opposite sides of each crankshaft with their axes at right angles to the plane in which lie the axes of rotation of the two crankshafts, gearing connecting the crankshafts so that they rotate at the same speed and each piston in a bank reaches its top dead centre at the same moment as the corresponding piston in the adjacent bank, the firing interval between corresponding cylinders in adjacent banks being 360° of crankshaft rotation and each cylinder in a bank firing simultaneously with a cylinder in the adjacent bank, two main exhaust pipes each extending between two adjacent banks of cylinders and a short connecting pipe connecting each cylinder to the adjacent main exhaust pipe.

11. A four-stroke cycle internal combustion engine including in combination two similar parallel crankshafts each having cranks 1 and 6 angularly coincident, cranks 2 and 5 angularly coincident and cranks 3 and 4 angularly coincident, two banks of cylinders each containing six cylinders disposed on diametrically opposite sides of each crankshaft with their axes at right angles to the plane in which lie the axes of rotation of the two crankshafts, gearing connecting the crankshafts so that they rotate at the same speed and each piston in a bank reaches its top dead centre at the same moment as the corresponding piston in the adjacent bank, the firing interval between corresponding cylinders in adjacent banks being 360° of crankshaft rotation and each cylinder in a bank firing simultaneously with a cylinder in the adjacent bank, two main exhaust pipes each extending between two adjacent banks of cylinders and a short connecting pipe connecting each cylinder to the adjacent main exhaust pipe.

12. A four-stroke cycle internal combustion engine including in combination two similar parallel crankshafts each crank of each of which is angularly coincident with another crank of the same crankshaft, two banks of cylinders each containing six cylinders disposed on diametrically opposite sides of each crankshaft with their axes at right angles to the plane in which lie the axes of rotation of the two crankshafts, gearing connecting the crankshafts so that they rotate at the same speed and each piston in a bank reaches its top dead centre at the same moment as the corresponding piston in the adjacent bank, the firing interval between corresponding cylinders in adjacent banks being 360° of crankshaft rotation and each cylinder in a bank firing simultaneously with a cylinder in the adjacent bank, two main induction pipes each extending between two adjacent banks of cylinders, a short connecting pipe extending from each individual cylinder to the adjacent main induction pipe, two main exhaust pipes each extending between two adjacent banks of cylinders, and a short connecting pipe connecting each cylinder to the adjacent main exhaust pipe.

13. A four-stroke cycle internal combustion engine including in combination two similar parallel crankshafts each having cranks 1 and 6 angularly coincident, cranks 2 and 5 angularly coincident and cranks 3 and 4 angularly coincident, two banks of cylinders each containing six cylinders disposed on diametrically opposite sides of each crankshaft with their axes at right angles to the plane in which lie the axes of rotation of the two crankshafts, gearing connecting the crankshafts so that they rotate at the same speed and each piston in a bank reaches its top dead centre at the same moment as the corresponding piston in the adjacent bank, the firing interval between corresponding cylinders in adjacent banks being 360° of crankshaft rotation and each cylinder in a bank firing simultaneously with a cylinder in the adjacent bank, two main induction pipes each extending between two adjacent banks of cylinders, a short connecting pipe extending from each individual cylinder to the adjacent main induction pipe, two main exhaust pipes each extending between two adjacent banks of cylinders and a short connecting pipe connecting each cylinder to the adjacent main exhaust pipe.

FRANK BERNARD HALFORD.